United States Patent
Walters et al.

[11] Patent Number: 5,825,962
[45] Date of Patent: Oct. 20, 1998

[54] OPTICAL FIBER SPLICE HOUSING

[75] Inventors: Mark D. Walters, Azle; Kevin L. Morgan, Paradise; Robert W. Dennis, Haltom City, all of Tex.

[73] Assignee: Siecor Corporation, Hickory, N.C.

[21] Appl. No.: 775,678

[22] Filed: Dec. 31, 1996

[51] Int. Cl.[6] .................................................. G02B 6/36
[52] U.S. Cl. ............................................................. 385/135
[58] Field of Search ........................................ 385/134, 135

[56] References Cited

U.S. PATENT DOCUMENTS

| Re. 34,955 | 5/1995 | Anton et al. ............................. 385/53 |
|---|---|---|
| 4,630,886 | 12/1986 | Lauriello et al. ....................... 350/96.2 |
| 4,708,430 | 11/1987 | Donaldson et al. .................... 350/96.2 |
| 4,911,662 | 3/1990 | Debortoli et al. ....................... 439/719 |
| 5,093,885 | 3/1992 | Anton ...................................... 385/134 |
| 5,100,221 | 3/1992 | Carney et al. ........................... 385/135 |
| 5,129,030 | 7/1992 | Petrunia .................................. 385/135 |
| 5,179,618 | 1/1993 | Anton ...................................... 385/136 |
| 5,303,320 | 4/1994 | Duffie ...................................... 385/135 |
| 5,339,379 | 8/1994 | Kutsch et al. ........................... 385/135 |
| 5,363,465 | 11/1994 | Korkowski et al. .................... 385/135 |
| 5,402,515 | 3/1995 | Vidacovich et al. .................... 385/135 |

*Primary Examiner*—John Ngo

[57] ABSTRACT

An optical fiber splice housing is provided for connection to a distribution frame adjacent to the rear of an optical fiber raceway unit. The splice housing comprises a cabinet having a front end defining a cabinet height and a cabinet width and a rear end defining a rear facing opening. The front end of a cabinet is adapted for connection to a distribution frame adjacent the rear side of the raceway member, and the cabinet height is not greater than the raceway height while the cabinet width is not greater than the raceway width. The splice housing can therefore be connected to a distribution frame adjacent to the rear side of a raceway unit without using additional vertical space in the frame and access to a splice tray mounted on the splice tray shelf can be had through the rear facing opening of the cabinet.

17 Claims, 5 Drawing Sheets

OPTICAL FIBER SPLICE HOUSING

TECHNICAL FIELD OF THE INVENTION

This invention relates to optical wave guides also known as optical fibers. In one aspect, it relates to an optical fiber splice housing for mounting adjacent to the rear side of an optical fiber raceway unit in a distribution frame.

BACKGROUND OF THE INVENTION

Optical fibers are increasingly preferred over copper wires for the transmission of telecommunication signals and other data. Once used only in specialized, high-density applications, optical fiber networks are increasingly being utilized in the so-called "premises market" to provide signal transmission between groups of nearby buildings, such as a university or business campus, and even for intra-building connections of telephone systems, computer networks and other such office systems.

Optical fiber connection apparatus, also known as distribution frames, are used where ever the interconnection or cross-connection of multiple optical fibers is required, such as where an optical fiber cable comprising numerous individual fibers enters a building for connection to the individual optical fibers of the building's computer network. Due to space limitations in many buildings, it is desirable that the connection apparatus allow for the interconnection of a large number of individual fibers in as small as space as possible, thus requiring a high density of connections. It is also desirable to make the work of technicians installing and servicing the connection apparatus and associated optical fibers as simple as possible.

The typical distribution frame includes at least one optical fiber connector panel, also known as a patch panel, which is a flat panel having an array of fiber optic adapters mounted therethrough. Each adapter allows the interconnection of two optical fibers by plugging specially tailored connector terminals, also known simply as connectors, into opposite ends of the adapter. The individual fibers can then be routed out the top, bottom or sides of the panel, thus allowing a large number of connectors to fit into a small patch panel without the routing and tracing of individual fibers becoming too difficult for the technician. Patch panels can be mounted in a cabinet or housing for protection of the optical fibers being routed to the adapters. The housing is usually adapted for mounting to the supporting frame or rack. A horizontal raceway is another common piece of hardware for routing optical fibers to and from rack mounted equipment. A raceway typically has openings along the top and/or bottom so that fibers can be routed out of the top or bottom of a connector panel and into the raceway. When used with a patch panel that does not have a housing attached to the rear side, the raceway can be double-sided so that fibers feeding the rear of the connector panel can be routed along the rear side of the raceway. However, if the connector panel has a housing on the rear side that requires fibers to enter the housing at the far end of the housing, as is often the case for connector panel housings for optical fiber connectors, then the rear side of the raceway cannot be used to route fibers to or from the housing and the space behind the raceway becomes useless "dead" space.

Another aspect of optical fiber distribution systems involves the connectorization of the optical fibers in a cable. Whenever a fiber cable comprising many individual fibers is to be interconnected by means of a connector panel, each fiber must first be terminated with a connector which is compatible with the connector panel. Currently, one of two methods is used for the termination of such cables. The first method is direct connectorization. This process entails attaching connectors directly on to the ends of the fibers leading out of the end of the cable. This method requires specialized skill and equipment to obtain connections having consistent optical properties. The second commonly used connectorization method is known as splicing. This process involves the splicing of fiber pigtails having factory-installed connectors to the ends of the fiber leading from the cable. Using spliced pigtails insures that all connectors will have consistent optical properties. However, the splicing method also involves the use of splicing trays, which are typically small rectangular units for holding and protecting the splice junction between the cable end and the pigtail. When this splicing method is used, then typically either a separate housing in the distribution frame must be allocated to hold the splice trays, or the connector panel housing must have some of its interior space allocated to house the splice trays. For example, U.S. Pat. Nos. 4,708,430 and 5,093,885 describe optical fiber connector panel housings having splice trays disposed in the interior of the housing. In either case, valuable frame space must be used up to accomplish the splicing. A need therefore exists for an optical fiber splice housing providing for the mounting of splice trays in a distribution frame, while at the same time not utilizing additional vertical space in the distribution frame and not taking up room in the interior of connector panel housings.

SUMMARY OF THE INVENTION

In one aspect of the present invention, a fiber distribution frame is provided that has at least one connector housing for the interconnection of optical fiber cables. The connector housing is generally box shaped and has a top and a bottom and a front side facing frontward and a rear side facing rearward. The connector housing has a depth defined between the front and rear side. A horizontal raceway is mounted along the top or bottom of at least one connector housing. The raceway has a top and a bottom and a front side facing frontward for managing cables that are routed therealong and a rear side opposite thereto. The at least one raceway has a depth defined between the front side and the rear side, and the depth of the raceway is less than the depth of the at least one connector housing. The rear side of the raceway is located frontward of the rear side of the connector housing. The raceway having a height defined between the top and the bottom. A splice housing for containing splices or other connections to any cables egressing from the rear side of the connector housing is mounted rearward of the horizontal raceway and generally co-planar therewith. The splice housing has a height substantially equal to that of the raceway and has a depth such that it generally extends the distance from the rear side of the raceway to the rear side of the connector housing. As such, the present invention combines the use of a raceway and a splice housing, without sacrificing space.

In accordance with one aspect of the present invention, an optical fiber splice housing is provided for mounting adjacent to an optical fiber raceway unit of a type including a raceway member having a front side defining a raceway height and a raceway width, a plurality of cable management brackets mounted to the front side, and a rear side. The splice housing comprises a cabinet having a front end defining a cabinet height and a cabinet width and a rear end defining a rear facing opening. The front end of the cabinet is adapted for connection to a distribution frame adjacent to the rear side of the raceway member. The cabinet height is not greater than the raceway height and the cabinet width is not greater than the raceway width. A splice tray shelf for removably mounting at least one optical fiber splice tray is provided in the cabinet. The splice housing can thus be mounted to a distribution frame adjacent the rear side of the raceway without using additional vertical space in the frame. Access to the splice tray mounted in the splice housing can be had through the rear facing opening of the cabinet. In a preferred embodiment of this aspect, the splice tray shelf is adapted to mount a plurality of fiber optic splice trays.

In accordance with another aspect of the present invention, the splice housing further comprises a slack-storage spool mounted in the cabinet adjacent to the splice tray shelf.

In accordance with another aspect of the present invention, the splice housing further comprises a door pivotally attached to the rear end of the cabinet for enclosing the rear facing opening of the cabinet and at least one opening formed in the cabinet for passing optical fibers therethrough.

In accordance with another aspect of the present invention, the splice housing further comprises a drawer having the splice tray shelf mounted thereupon. The drawer is slidably mounted within the cabinet so that the drawer can be pulled out in a horizontal direction from the rear facing opening of the cabinet. Access to the splice tray shelf is enhanced when the drawer is pulled out of the cabinet. In a more preferred embodiment of this aspect, the splice housing further comprises a stop member for arresting the rearward movement of the drawer when the drawer is pulled out from the rear facing opening of the cabinet. In a still more preferred embodiment of this aspect, the splice housing further comprises a door pivotally attached to a rear edge of the drawer for enclosing the rear facing opening of the cabinet when the drawer is not pulled out of the cabinet and at least one opening formed in the cabinet for passing optical fibers therethrough.

In accordance with another aspect of the current invention, an optical fiber splice housing and raceway unit is provided. The unit comprises a raceway member adapted for mounting in a distribution frame and a splice housing member including a cabinet and a splice tray shelf for removably mounting at least one optical fiber splice tray in the cabinet.

BRIEF DESCRIPTION OF THE DRAWINGS

A more complete understanding of the invention and its advantages will be apparent from the following detailed description when taken in conjunction with the accompanying drawings in which.

DETAILED DESCRIPTION

Figure 1:
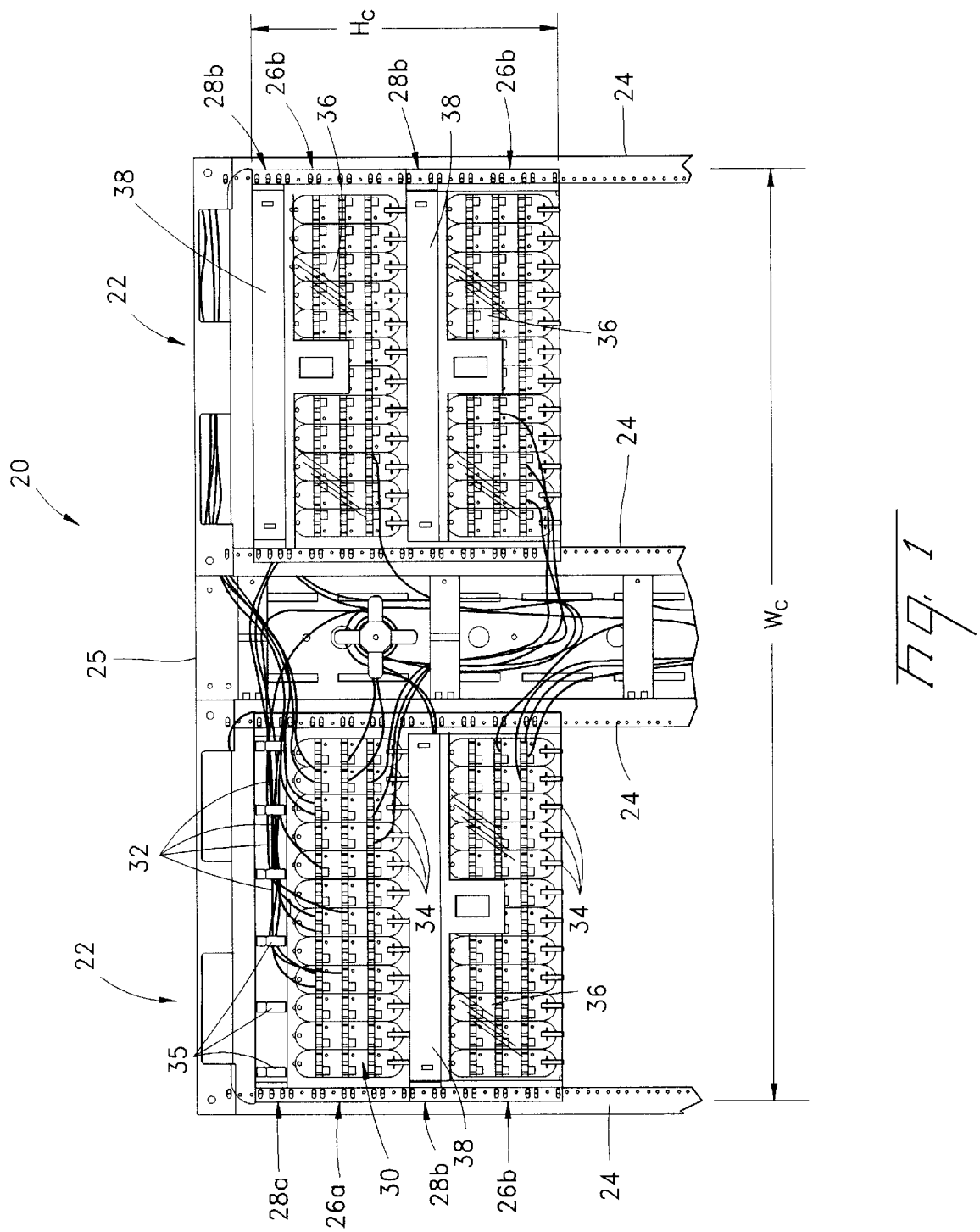
FIG. 1 is a generalized front view of an optical fiber distribution facility of a type which can include an optical fiber splice housing according to one embodiment of the present invention.

Referring now to the drawings, wherein like reference characters designate like or corresponding parts throughout several views, an optical fiber splice housing forming one embodiment of the present invention is illustrated. Referring first to FIG. 1, a front view of a fiber optic distribution center 20 is shown which can incorporate an optical fiber splice housing according to the current invention. The typical distribution center 20 comprises one or more vertical equipment stacks 22, also known as bays, each comprising several components supported by vertical frame members 24. The frame members 24 may be attached to a wall or free standing on the floor. The distribution facility shown in FIG. 1 comprises two equipment bays 22, however, it will be readily apparent that the number of bays to be used will be dependent on the number of connections required in the distribution facility. When multiple adjacent bays are used as shown in FIG. 1, an inter-bay storage unit 25 may be positioned between bays 22 to further aid in cable management.

Referring still to FIG. 1, each equipment bay 22 typically includes at least one optical fiber connector housing 26, also known as a patch panel, and at least one horizontal raceway 28 positioned above and adjacent each connector housing 26. In the distribution facility shown in FIG. 1, each equipment bay 22 has two connector housing 26 and two horizontal raceways 28. As best seen in the connector panel marked 26a, which has the door removed for purposes of illustration, each connector housing 26 includes a connector panel 30 for interconnecting individual optical fibers 32 at the front side of connector panel 30 to other optical fibers (not shown) at the rear side of connector panel 30. The connector housing 26 can further include a plurality of cable management brackets 34 positioned below the connector panel to facilitate the routing of optical fibers 32. As best seen in the horizontal raceway 28a, which has a front cover removed for the purposes of illustration, each horizontal raceway 28 can also include a plurality of cable management brackets 35 to facilitate the routing of optical fibers 32 from connector panel 30 through the top of the connector housing 26 and along raceway 28. The optical fibers 32 from each connector housing 26 can then be routed via the horizontal raceways 28 and the inter-bay storage unit 25 to other connector housings 26 in the distribution facility 20 or to optical cables for interconnection with other parts of the user's facility. After installation or maintenance of the optical fibers, a door 36, best seen on housings marked 26b, can be shut over the forward cable area of each connector housing 26 to protect the fibers and connectors from damage. Similarly, protective covers 38 can be affixed on the horizontal raceways 28, best seen in horizontal raceways marked 28b, to further protect the optical fibers routed therethrough.

In the distribution frame 22 shown in FIG. 1, the connector housings 26 and raceway units 28 have a total vertical component height, $H_c$, and a total horizontal component width, $W_c$, as shown. When the splicing method of fiber connectorization is used, it is necessary to provide storage space for the splice tray units. It is known in the industry to provide a separate splice tray housing in the distribution frame to provide such storage space for the splice tray units, however, this will increase $H_c$ or $W_c$ for the distribution frame. It also is known to allocate space within a connector panel housing to provide storage space for the splice tray units, however, this takes up room normally reserved for the routing of fibers, and thus tends to reduce the fiber density available in that patch panel. Because of space limitations in many premises installations, it is desirable to minimize $H_c$ and $W_c$ to the extent possible, and also to provide connector panel housings with unobstructed fiber routing spaces to allow for high fiber connection densities. The current invention provides an apparatus allowing the storage of splice trays in the distribution frame without utilizing additional vertical or horizontal space in the distribution frame and without taking up room in the interior of connector panel housings.

Figure 2:
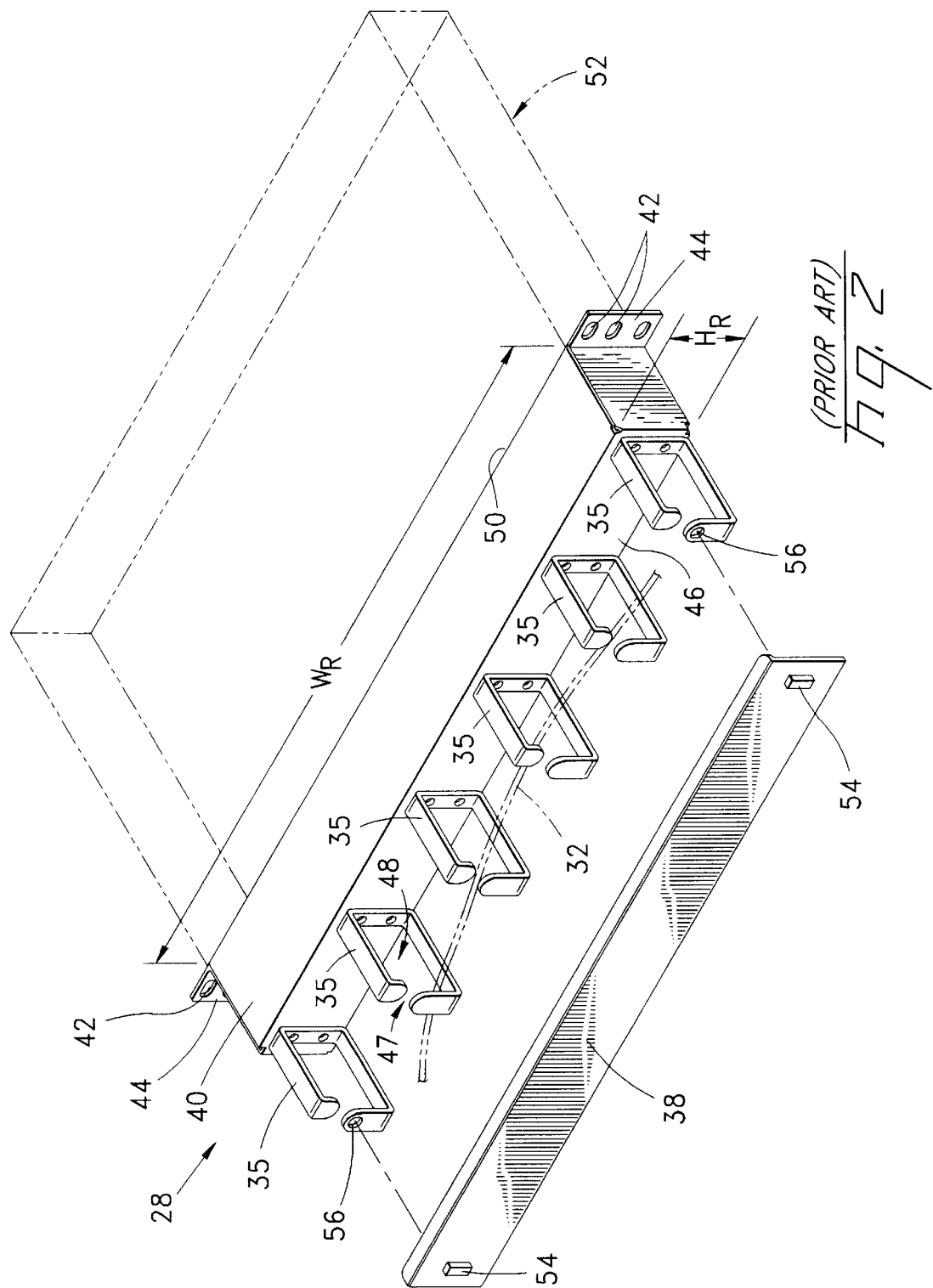
FIG. 2 is a front perspective view, with some portions exploded, of a prior art optical fiber raceway unit.

Referring now to FIG. 2, a Prior Art optical fiber raceway unit 28 is shown. Raceway unit 28 includes a raceway member 40 which is adapted for mounting in a distribution frame (not shown). The raceway unit 28 shown in FIG. 2 has a plurality of mounting holes 42 formed in mounting flanges 44 for mounting the raceway unit to the distribution frame, however, other mounting means are known in the art. Raceway member 40 further includes a front side 46 defining a raceway height, $H_R$, and a raceway width, $W_R$. A plurality of cable management brackets 35 are mounted to the front side 46 of raceway member 40. Each bracket 35 can have a slot 47 to facilitate the positioning of optical fiber 32 (shown in phantom) within the cable routing area 48 defined by each bracket. The raceway member 40 further comprises a rear side 50 which faces away from the cable management brackets 35 and is generally accessible only from the rear side of the distribution frame. When the rear side 50 of the raceway unit 28 does not include brackets or other cable management devices, then a dead space 52 (shown in phantom) is said to exist behind rear side 50 of the raceway unit. As previously discussed, a cover 38 can be provided for raceway unit 28 to further protect fibers 32 being routed through cable management brackets 35. In the embodiment shown in FIG. 2, cover 38 is releasably mounted to cable management brackets 35 by connector pins 54 which interconnect with connector holes 56 formed in one or more of the cable management brackets 35. While preferred, the use of cover 38 is optional.

Figure 3:
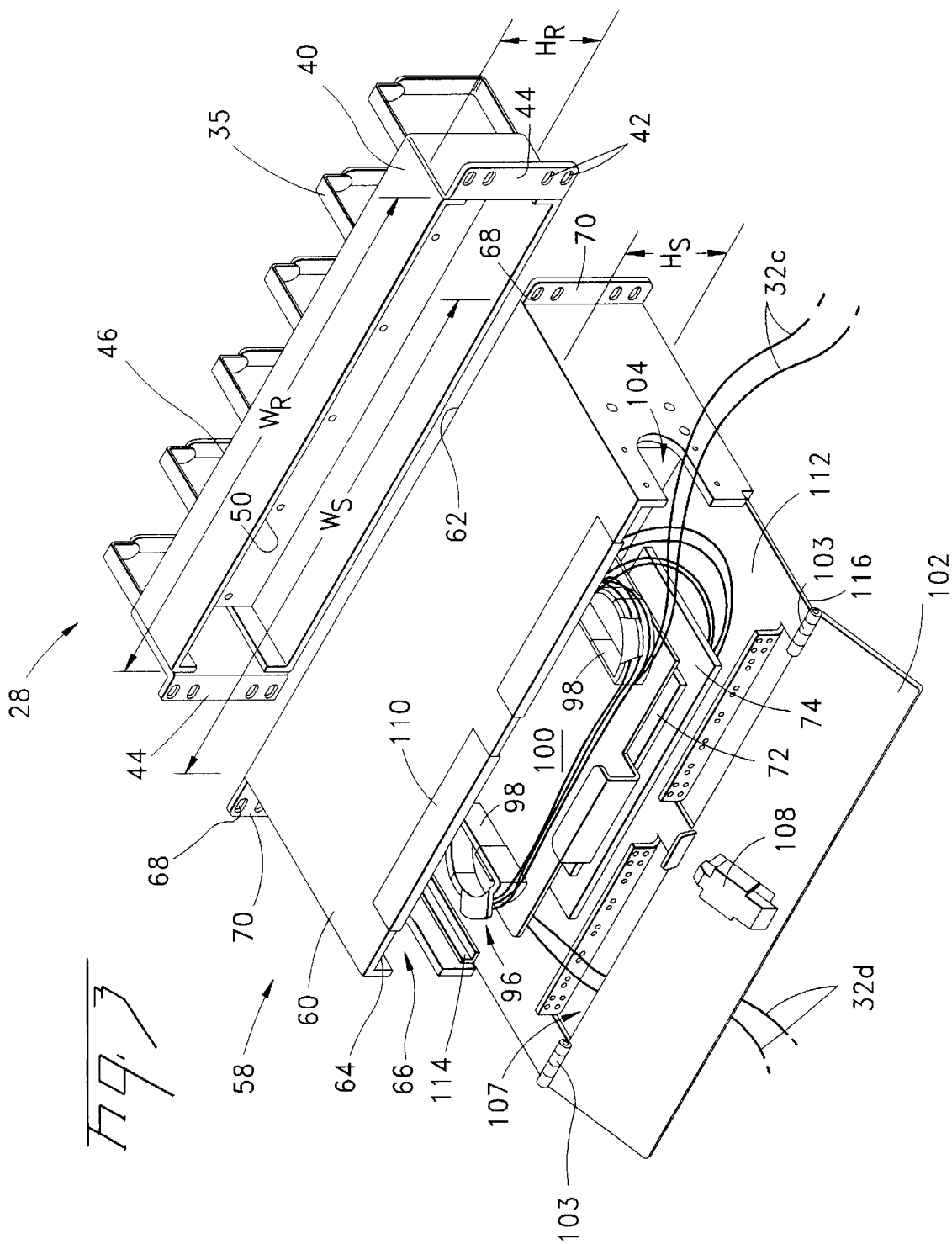
FIG. 3 is a rear perspective view of an optical fiber splice housing according to one aspect of the current invention and a raceway unit.

Referring now to FIG. 3, a rear perspective view is shown of an optical fiber splice housing 58, according to one aspect of the current invention, positioned behind a horizontal raceway unit 28 as previously described. Splice housing 58 comprises a cabinet 60 having a front end 62 defining a cabinet height, $H_S$, and a cabinet width, $W_S$ and a rear end 64 defining a rear facing opening 66. The front end 62 of the cabinet 60 is adapted for connection to a distribution frame (not shown) adjacent to the rear side 50 of the raceway unit 28. In the embodiment shown, splice housing 58 includes mounting holes 68 formed in mounting flanges 70 connected to the front end 62 of cabinet 60. Housing 58 can thus be connected to a distribution frame adjacent to raceway 28 in one of two ways. First, the raceway unit 28 may be attached to the front side of the distribution frame members using fasteners (not shown) passing through mounting holes 42 in mounting flanges 44 while the splice housing 58 is attached to the rear side of the distribution frame members using additional fasteners (not shown) passing through mounting holes 68 in mounting flanges 70. Alternatively, both splice housing 58 and raceway unit 28 may be attached to the front side of the distribution frame members by aligning the mounting holes 68 and 42 of the respective units and using a single set of fasteners (not shown) to hold the units 58, 28 together and to the distribution frame member. The cabinet height, $H_S$, of cabinet 60 is not greater than the raceway height, $H_R$, of the raceway member 28 and the cabinet width, $W_S$, of cabinet 60 is not greater than the raceway width, $W_R$, of the raceway member 28, therefore, splice housing 58 fits within the dead zone 52 (best seen in FIG. 2), which is normally wasted space on the rear side of the distribution frame. Referring still to FIG. 3, the splice housing 58 further comprises a splice tray shelf 72 for removably mounting at least one optical fiber splice tray 74 in the cabinet 60. The splice housing 58 according to the current invention can be connected to a distribution frame adjacent to the rear side 50 of a raceway unit 28 without using additional vertical space in the frame. Access to the splice tray 74 mounted on the splice tray shelf 72 can be had through the rear facing opening 66 of the cabinet 60. The space-saving nature of this invention is of particular utility for distribution frames being used in the premises market because it does not require additional vertical rack space in the distribution frame, while at the same time, it does not require space within the connector panel housings to be allocated for the storage of splice trays.

Figure 4:
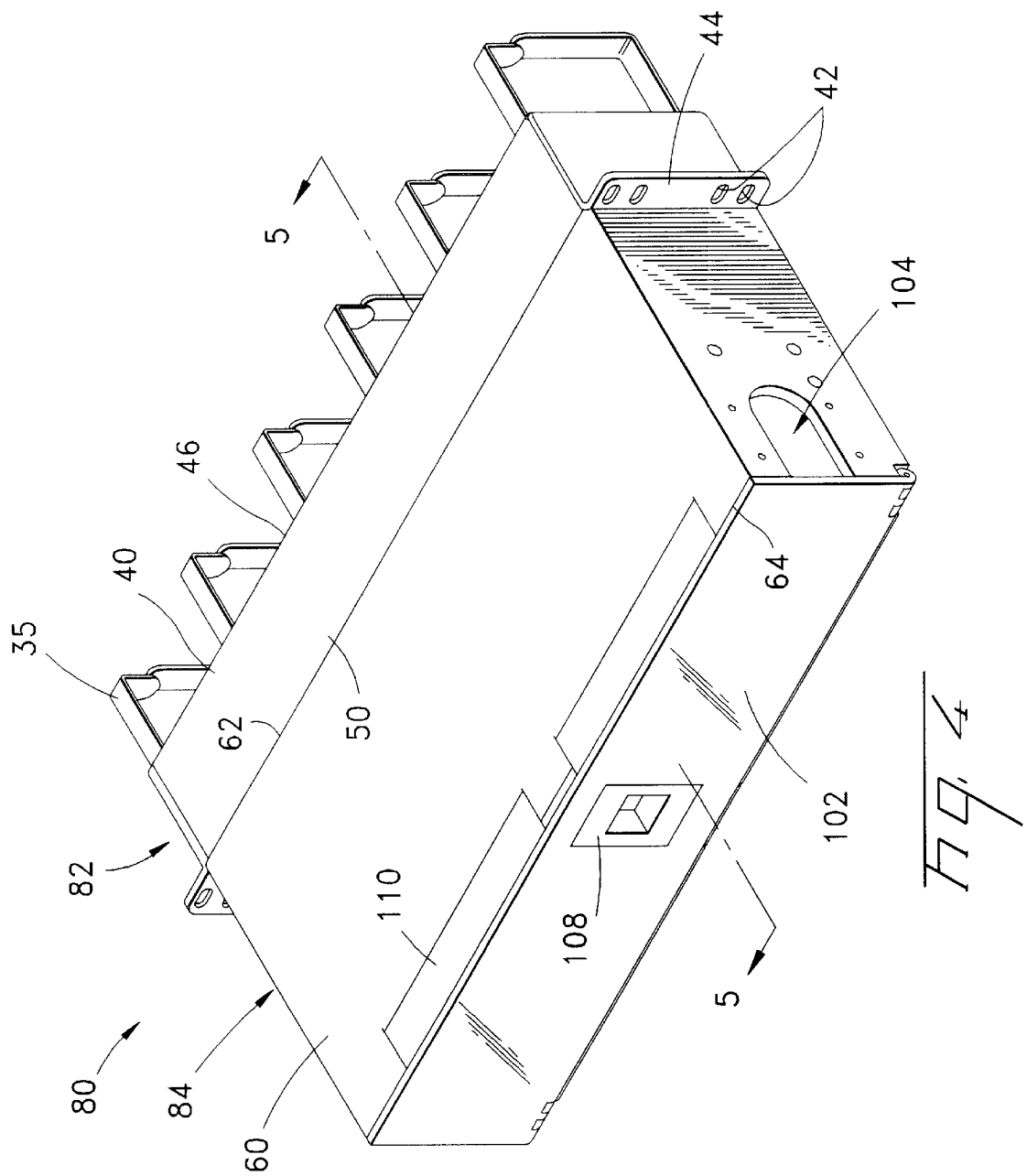
FIG. 4 is a rear perspective view showing an optical fiber splice housing and raceway unit according to another aspect of the current invention.
Figure 5:
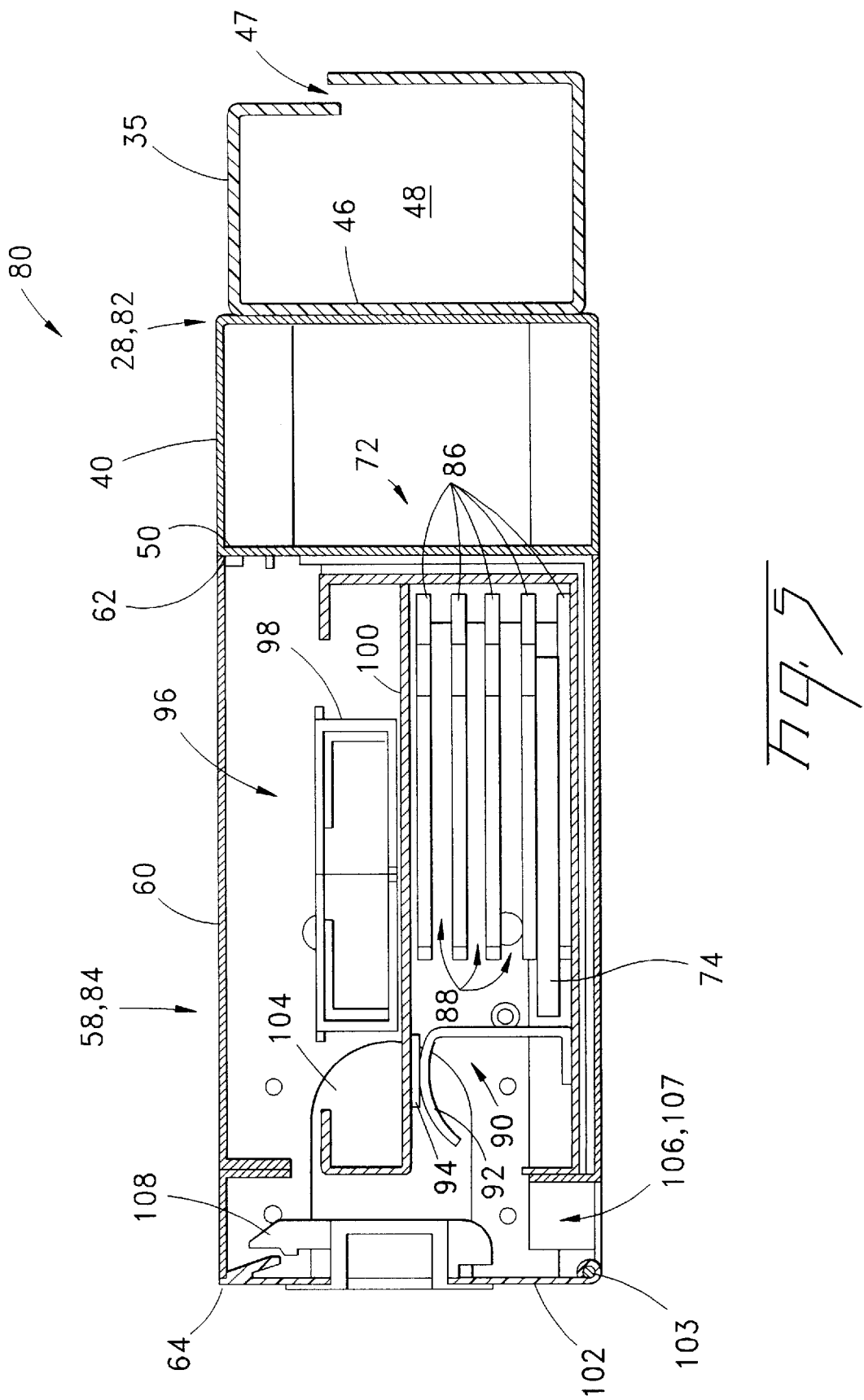
FIG. 5 is a sectional side view of the optical fiber splice housing and raceway unit of FIG. 4, taken along line 5—5 of FIG. 4.

Referring now also to FIGS. 4 and 5, an optical fiber splice housing and raceway unit 80, according to another aspect of the current invention, is shown. The splice housing and raceway unit 80 comprises a raceway member 82 and a splice housing member 84 and is adapted for mounting in a distribution frame. It will be readily apparent that the majority of elements comprising raceway member 82 are similar to the like-numbered elements of the stand-alone raceway unit 28 previously discussed, and the majority of elements of splice housing member 84 are identical to like-numbered elements in the stand-alone splice housing unit 58 previously described. Thus, the following description of additional embodiments of the current invention is generally applicable to both the stand-alone splice housing unit aspect and the combined splice housing and raceway unit aspect unless specifically stated otherwise.

Referring now to FIGS. 3 and 5, in a preferred embodiment of the current invention, the splice tray shelf 72 is adapted to mount a plurality of fiber optic splice trays. In this embodiment (best seen in FIG. 5), splice tray shelf 72 comprises a plurality of support elements 86 which are generally parallel and spaced apart from one another to form tray gaps 88 therebetween for holding splice trays 74. In this embodiment, five support elements 86 are provided forming four gaps 88, three of which are shown empty and one of which is shown holding a splice tray 74 in FIG. 5. In addition, because the inherent mechanical springiness of the fibers leading into the splice tray can sometimes inadvertently dislodge splice trays 74 from the splice tray shelf 72, a retaining device 90 can be provided to prevent the unintentional movement of the splice trays. In the embodiment shown, retaining device 90 comprises a strap 92 of hook-and-loop material (such as that sold under the trademark Velcro®) which may be affixed to a latch 94 of compatible hook-and-loop material whereby the strap 92 can be disengaged from the latch 94 when access to the splice trays 74 is required and then readily reengaged to secure the splice trays once maintenance activities are completed.

Referring still to FIGS. 3 and 5, a slack-storage apparatus 96 can be provided in cabinet 60 adjacent the splice tray shelf 72 to aid in the routing and storage of slack in the fibers being routed to the splice trays. In the embodiment shown in FIG. 3, slack storage apparatus 96 comprises a pair of storage spools 98 mounted on a storage platform 100 disposed above adjacent to splice tray shelf 72. It will be readily apparent, however, that other configurations for slack storage apparatus 96 as known in the art could be used without departing from the scope of the current invention.

Referring now also to FIG. 4, to provide for increased security and protection of the fibers and splice trays, cabinet 60 can further comprise a door 102 pivotally attached to the rear end 64 for enclosing the rear facing opening 66 and at least one opening 104 formed in the cabinet for passing optical fibers 32 therethrough. In the embodiment shown, door 102 is connected to cabinet 60 by hinges 103 and further comprises a latch mechanism 108 for securing the door in a closed position. While preferred, latch mechanism 108 is optional. It will be readily apparent that openings have a number of configurations can be formed in cabinet 60 for passing optical fibers 32 therethrough. As best seen in FIG. 3, these include openings 104 formed in the sides of cabinet 60, thereby allowing incoming fibers (marked as 32c) to be advantageously routed to slack storage apparatus 96. As best seen in FIG. 5, cabinet 60 can further include openings 106 formed in the bottom, thereby allowing outgoing fibers to be routed to below adjacent connector panel housings. As best seen in FIGS. 3 and 4, the cabinet 60 can further include knockout panels 110 formed on the top allowing the user the option to form additional openings if necessary for the convenient routing of fibers.

Referring again to FIGS. 3 and 5, in another embodiment of the current invention, and applicable to both of the splice housing aspect and the splice housing and raceway unit aspect, splice housing cabinet 60 can further comprise a drawer 112 having the splice tray shelf 72 mounted thereupon. The drawer 112 is slidably mounted within the cabinet 60 so that the drawer can be pulled out in a horizontal direction from the rear facing opening 66, thereby enhancing access to the splice tray shelf 72 and any splice trays 74 mounted thereupon. The drawer 112 may be slidably mounted to cabinet 60 on rail members 114 (best seen in FIG. 3) or by other mechanisms known in the art. A stop member (not shown) can be provided on cabinet 60 for arresting the rearward movement of the drawer 112 when the drawer is pulled out from the rear facing openings of cabinet 60. In a more preferred embodiment, a door 102 is pivotally attached to a rear edge 116 of the drawer 112, for enclosing the rear facing opening 66 when the drawer 112 is not pulled out of the cabinet 60, and at least one opening is formed in the cabinet for passing optical fibers 32 therethrough.

In the embodiment shown in FIG. 3, in addition to side openings 104 and bottom openings 106 (best seen in FIG. 5), when drawer 112 is used, additional openings 107 can be formed in drawer 112 for passing optical fibers 32 therethrough whether or not the drawer has been pulled from the cabinet. In FIG. 3, outgoing fibers, marked 32d, are shown passing through opening 107 in drawer 112 for convenient routing to equipment positioned beneath splice housing 58.

Although several embodiments of the present invention have been illustrated in the accompanying drawings and described in the foregoing Detailed Description, it will be understood that the invention is not limited to the embodiments disclosed, but is capable of numerous rearrangements, modifications and substitution of parts and elements without departing from the scope and spirit of the invention.

We claim:

1. An optical fiber splice housing for mounting adjacent to an optical fiber raceway unit of a type including a raceway member being adapted for mounting in a distribution frame and having a front side defining a raceway height and a raceway width, a plurality of cable management brackets mounted to the front side, and a rear side opposite the front side, said splice housing comprising:
   (a) a cabinet having a front end defining a cabinet height and a cabinet width, and a rear end defining a rear-facing opening;
   said front end of said cabinet being adapted for connection to a distribution frame adjacent the rear side of said raceway unit;
   said cabinet height being not greater that the raceway height of said raceway member; said cabinet width being not greater than said raceway width of said raceway member; and
   (b) a splice tray shelf for removably mounting at least one optical fiber splice tray within said cabinet;
   whereby said splice housing can be connected to said distribution frame adjacent the rear side of said raceway unit without using additional vertical space in said frame and whereby a splice tray mounted on said splice tray shelf is accessible through the rear-facing opening of said cabinet.

2. An optical fiber splice housing according to claim 1, wherein said splice tray shelf is adapted to mount a plurality of fiber optic splice trays.

3. An optical fiber splice housing according to claim 2, further comprising a slack-storage spool mounted in said cabinet adjacent said splice tray shelf.

4. An optical fiber splice housing according to claim 2, further comprising:
   (a) a door pivotally attached to said rear end of said cabinet for enclosing said rear-facing opening of said cabinet; and
   (b) at least one opening formed in said cabinet for passing optical fibers therethrough.

5. An optical fiber splice housing according to claim 1, further comprising a drawer having said splice tray shelf mounted thereupon;
   said drawer being slidably mounted within said cabinet so that said drawer can be pulled out in a horizontal direction from the rear-facing opening of said cabinet; whereby access to said splice tray shelf is enhanced when said drawer is pulled out of said cabinet.

6. An optical fiber splice housing according to claim 5, wherein said splice tray shelf mounted on said drawer is adapted to mount a plurality of fiber optic splice trays.

7. An optical fiber splice housing according to claim 6, further comprising a slack-storage spool mounted on said drawer adjacent said splice tray shelf.

8. An optical fiber splice housing according to claim 5, further comprising a stop member for arresting the rearward movement of said drawer when the drawer is pulled out from rear-facing opening of the cabinet.

9. An optical fiber splice housing according to claim 5, further comprising:
   (a) a door pivotally attached to a rear edge of said drawer for enclosing said rear-facing opening of said cabinet when said drawer is not pulled out of said cabinet; and
   (b) at least one opening formed in said cabinet for passing optical fibers therethrough.

10. An optical fiber splice housing and raceway unit comprising:
    (a) a raceway member being adapted for mounting to a distribution frame and having a front side defining a raceway height and a raceway width, cable management brackets mounted to the front side and a rear side opposite the front side;
    (b) a splice housing member including:
       (i) a cabinet having a front end defining a cabinet height and a cabinet width and a rear end defining a rear-facing opening;
       said front end of said cabinet being connected to the rear side of said raceway unit;
       said cabinet height being not greater than said raceway height;
       said cabinet width being not greater than said raceway width;
       (ii) a splice tray shelf for removably mounting at least one optical fiber splice tray within said cabinet;

whereby said splice housing and raceway unit can be mounted to a distribution frame and whereby a splice tray mounted on said splice tray shelf is accessible through the rear-facing opening of said cabinet.

11. An optical fiber splice housing and raceway unit according to claim 10, wherein said splice tray shelf is adapted to mount a plurality of fiber optic splice trays.

12. An optical fiber splice housing and raceway unit according to claim 11, further comprising a slack-storage spool mounted in said cabinet adjacent said splice tray shelf.

13. An optical fiber splice housing and raceway unit according to claim 12, further comprising:

(a) a door pivotally attached to said rear end of said cabinet for enclosing said rear-facing opening of said cabinet; and (b) at least one opening formed in said cabinet for passing optical fibers therethrough.

14. An optical fiber splice housing and raceway unit according to claim 10, further comprising a drawer having said splice tray shelf mounted thereupon;

said drawer slidably mounted within said cabinet so that said drawer can be pulled out in a horizontal direction from the rear-facing opening of said cabinet, thereby enhancing access to said splice tray shelf.

15. An optical fiber splice housing and raceway unit according to claim 14, further comprising a stop member for arresting the rearward movement of said drawer when the drawer is pulled out from rear-facing opening of the cabinet.

16. An optical fiber splice housing and raceway unit according to claim 14, further comprising:

(a) a door pivotally attached to a rear edge of said drawer for enclosing said rear-facing opening of said cabinet when said drawer is not pulled out of said cabinet; and (b) at least one opening formed in said cabinet for passing optical fibers therethrough.

17. A fiber distribution frame comprising:

(a) at least one connector housing for the interconnection of optical fiber cables, the connector housing generally box shaped and having a top and a bottom and a front side facing frontward and a rear side facing rearward, the at least one connector housing having a depth defined between the front and the rear side;

(b) a horizontal raceway mounted along the top or bottom of at least one of the at least one connector housing, the raceway having a top and a bottom and a front side facing frontward for managing cables that are routed therealong and a rear side opposite thereto, the at least one raceway having a depth defined between the front side and the rear side, the depth of the raceway being less than the depth of the at least one connector housing and the rear side of the raceway being located frontward of the rear side of the connector housing, the raceway having a height defined between the top and the bottom; and (c) a splice housing for containing splices or other connections to any cables egressing from the rear side of the connector housing mounted rearward of the horizontal raceway and generally co-planar therewith, the splice housing having a height substantially equal to that of the raceway and having a depth such that it generally extends the distance from the rear side of the raceway to the rear side of the connector housing.

* * * * *